United States Patent [19]
Akutagawa et al.

[11] 3,892,817
[45] July 1, 1975

[54] PROCESS FOR PRODUCING CYCLOALKENES
[75] Inventors: Susumo Akutagawa, Tokyo;
Hidenori Kumobayashi, Kanagawa;
Akira Komatsu, Tokyo, all of Japan
[73] Assignee: Takasago Perfumery Co., Ltd., Tokyo, Japan
[22] Filed: Mar. 1, 1974
[21] Appl. No.: 447,409

[30] Foreign Application Priority Data
Mar. 1, 1973 Japan.................................. 48-24643

[52] U.S. Cl........................... 260/666 A; 260/683 D
[51] Int. Cl.............................................. C07c 13/00
[58] Field of Search..................... 260/666 A, 683 D

[56] References Cited
UNITED STATES PATENTS
3,424,812  1/1969  Howman et al................. 260/683 D
3,634,539  1/1972  Alkema et al. ................. 260/683 D FOREIGN PATENTS OR APPLICATIONS
1,105,565  3/1968  United Kingdom............. 260/666 A OTHER PUBLICATIONS
R. H. Blom et al., Ind. & Eng. Chem., 54, pp. 16–22, 1962.
Dr. G. Wilke, Angew Chem., 69, pp. 397–398, 1957.
Dr. G. Wilke, Angew Chem., 75, pp. 10–20, 1963.

*Primary Examiner*—Veronica O'Keefe
*Attorney, Agent, or Firm*—Sughrue, Rothwell, Mion, Zinn & Macpeak

[57] ABSTRACT

A process for producing cyclopolyenes (1,5, . . . . $4n + 5$) having $8 + 4n$ carbon atoms where $n$ is an integer of from 1 to 7 comprising polymerizing cyclooctadiene in the presence of a rhenium catalyst using alumina or alumina-boria as a carrier. Cycloalkenes are useful as intermediates in perfumery and as additives for cosmetics.

9 Claims, No Drawings

PROCESS FOR PRODUCING CYCLOALKENES

BACKGROUND OF THE INVENTION

1. Field of the Invention

This invention relates to a process for producing cycloalkenes, in particular, cyclopolyenes (1,5, . . . 4n + 5) having 8 + 4n carbon atoms in which n is an integer of from 1 to 7 represented by the formula:

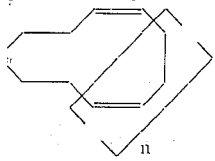

2. Description of the Prior Art

Known processes for synthesizing cycloalkenes recently reported are (1) a process for producing a 12-membered ring containing cycloalkene through the trimerization of butadiene using an organic metal catalyst [as described in G. Wilke: *Angewande Chemie*, 2, 105 – 164 (1963)] and (2) a process for producing cycloalkenes having 8n carbon atoms where n is an integer through the polymerization of cyclooctene [as disclosed in British Pat. No. 1,105,565].

SUMMARY OF THE INVENTION

The inventors have studied the polymerization process in which the same catalyst as reported in the above cited literature is used, that is, a rhenium catalyst using alumina or alumina-boria as a carrier and, as the result, have surprisingly discovered that cyclooctadiene exhibits behavior as if it were butadiene to provide cycloalkenes having 8 + 4n carbon atoms where n is an integer of from 1 to 7, such as 12, 16, 20, 24 . . . etc., carbon atoms when cyclooctadiene is polymerized using the above described catalyst.

Therefore, the process of this invention is based on a quite novel reaction, in which cycloalkenes having 8 + 4n carbon atom, where n is an integer of from 1 to 7, are produced, while the foregoing processes as described in Wilke, supra and British Pat. No. 1,105,565 provide compounds having carbon atoms corresponding to multiples of those of the raw materials as the result of the polymerization.

This invention provides a process for producing cyclopolyenes (1,5, . . . 4n + 5) having 8 + 4n carbon atoms where n is an integer of from 1 to 7 which comprises polymerizing cyclooctadiene in the presence of a rhenium catalyst on an alumina carrier or an alumina-boria carrier.

DETAILED DESCRIPTION OF THE INVENTION

The cycloalkenes produced according to the process of this invention are a series of compounds that have been unable to be synthesized easily so far and have wide variety of applications. For instance, a 16 membered cycloalkene can be converted into a macrocyclic ketone by oxidation, which is an important musk perfumery. Furthermore, the cycloalkenes can be effectively used as the basic material for cosmetics, as well as additives for polymers, adhesives or the like.

In the catalyst used in the process of this invention, the effective amount of a rhenium compound contained relative to the alumina carrier or alumina-boria carrier is 1 to 20 percent by weight, more specifically 10 percent by weight, as metallic rhenium. The effective amount of boria contained in the alumina-boria series carrier is 3 to 30 percent by weight, more specifically 10 percent weight, as boric acid.

Suitable rhenium compounds which can be used for the preparation of the catalyst of this invention are ammonium perrhenate ($NH_4Re_2O_4$) and rhenium heptoxide ($Re_2O_7$). The ammonium perrhenate can be applied on the carrier as an aqueous solution and the rhenium hetoxide can be applied as a dioxane solution and then calcined after removing the solvent. The calcination is suitably effected at about 350° to 800°C, particularly 550° to 580°C, for 3 to 10 hours, more specifically about 5 hours.

In practicing this invention, cyclooctadiene is reacted under heating with or without a solvent, e.g., a hydrocarbon solvent, in the aqueous or liquid phase in the presence of the above described catalyst. The solvent which can be used in this invention must have a boiling point less than that of cyclooctadiene, i.e., 149°C, and also it must be inert to this reaction. Suitable examples of solvents are saturated hydrocarbons such as n-heptane, n-octane, cyclohexane and the like, and halogenated hydrocarbons such as dichloromethane, dichloroethane and the like. The greater the amount of the solvent is, the higher the yield of the products (n=1 – 3) increases and further selectivity in the reaction increases. Generally, the solvent is used in an amount such that the cyclooctadiene is present in a proportion of 1 to 30 percent by volume in the reaction medium.

A sufficient amount of the catalyst ranges from about 1 to 10 percent by weight, preferably 6 to 7 percent by weight, based on the cyclooctadiene and the reaction temperature can be suitably selected within the range of about 40° to 200°C. preferably 70° to 130°C, depending on the type of the reaction, whether gaseous pahse or liquid phase, employed.

The medium or low membered cycloalkenes thus obtained according to the process of this invention are represented as follows:

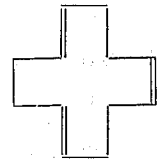

Cyclododecane-triene(1,5,9)

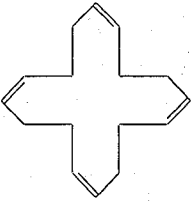

Cyclohexadeca-tetraene(1,5,9,13)

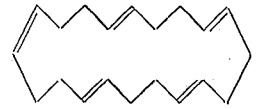

Cycloeicosa-pentaene(1,5,9,13,17)

These cycloalkenes successively differ in their number of carbon atoms by four and can be easily separated, e.g., using a simple distillation.

This invention is based on the novel reaction as described above and has the following advantages over the foregoing known process as described in British Pat. No. 1,105,565:

a. Since cyclooctadiene is easily obtainable through the dimerization of butadiene, it can be used as it is as a raw material in the process of this invention, and the partial hydrogenation step for converting into cyclooctene can be eliminated.

b. The reaction per se is more economical since the reactivity of the cyclooctadiene is higher than that of cyclooctene.

c. Since the products obtained according to this invention have the structure of the 1,5,9, . . . polyenes, unique and more useful applications can be expected for them as compared with 1,9,17 . . . polyenes produced by the process as described in British Pat. No. 1,105,565.

This invention will be illustrated in greater detail by reference to the following Examples. Unless otherwise indicated, all parts, percents, ratios and the like are by weight.

REFERENCE EXAMPLE 1

0.43 g of ammonium perrhenate was dissolved in 20 ml of distilled water, to which 3 g of γ-alumina of 30 to 60 mesh size was added. The mixture was allowed to stand at room temperature (about 20° – 30°C) for one day and dried under reduced pressure. The dried product was calcined by heating at 600°C for 2 hours in a dry air stream in an electric furnace and then at the same temperature for 1 hour in a dry nitrogen stream to provide the catalyst.

REFERENCE EXAMPLE 2

0.39 g of rhenium heptoxide was dissolved in 20 ml of dioxane, to which 3 g of γ-alumina of 60 to 100 mesh size and 1 g of boric acid were added. The mixture was allowed to stand at room temperature (about 20° – 30°C) for one day. The dioxane was distilled off under reduced pressure and the residue was calcined by heating at 600°C in a dry air stream for 2 hours and in a dry nitrogen stream for 1 hour to provide the catalyst.

EXAMPLE 1

30 g of cyclooctadiene (1,5) and 100 ml of n-heptane were added to 2 g of the catalyst prepared as described in Reference Example 1 and reacted at 70° to 75°C for 3 hours while stirring. The catalyst was filtered from the reaction solution and the n-heptane was recovered to give 30 g of a mixture of cycloalkenes.

The cycloalkenes were analyzed using gas chromatography, showing the following compositions: 6 % $C_{12}$, 5 % $C_{16}$, 12 % $C_{20}$, 10 % $C_{24}$, 9 % $C_{28}$, and 41 % $C_{36}$ and higher.

Moreover, they were analyzed by NMR spectroscopy, showing two types of signals of Ha (di-substituted olefin, 5.3 ppm) and Hb (allymethylene, 2.0 ppm) in a proportion of Ha:Hb = 1:2. From these results, it was confirmed that the cycloalkenes produced have the structure represented by the following formula:

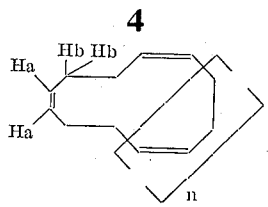

where $n$ is an integer of from 1 to 7.

Further, the above structure is supported by the results obtained using gas chromatography and mass spectroscopy.

EXAMPLE 2

3 g of the catalyst prepared as described in Reference Example 2 was charged into a quartz reaction tube with a 10 mm inner diameter and a 45 mm length. The reaction tube was heated to 130°C, through which 15 percent by weight cyclooctadiene diluted with nitrogen gas was passed. Over a period 7 hours, 45 g of cyclooctadiene was reacted to give quantitatively cycloalkenes.

The cycloalkenes thus obtained were analyzed using gas chromatography, showing the following composition: 15 % $C_{12}$, 22 % $C_{16}$, 13 % $C_{20}$, 9 % $C_{24}$, 7 % $C_{28}$, and 34 % $C_{32}$ and higher.

While the invention has been described in detail and with reference to specific embodiments thereof, it will be apparent to one skilled in the art that various changes and modifications can be made therein without departing from the spirit and scope thereof.

What is claimed is:

1. A process for producing cyclopolyenes (1,5,... 4n + 5) having 8 + 4n carbon atoms where n is an integer of from 1 to 7 comprising polymerizing cyclooctadiene in the presence of a rhenium catalyst on an alumina carrier or an alumina-boria carrier.

2. The process of claim 1, wherein the amount of said rhenium on said carrier ranges from 1 to 20 percent by weight, as metallic rhenium.

3. The process of claim 1, wherein the amount of boria in said alumina-boria catalyst ranges from 3 to 30 percent weight, calculated as boric acid.

4. The process of claim 1, wherein said polymerizing of said cyclooctadiene is in an inert solvent.

5. The process of claim 4, wherein said solvent is a hydrocarbon solvent.

6. The process of claim 5, wherein said hydrocarbon solvent is a saturated hydrocarbon solvent or a halogenated hydrocarbon solvent.

7. The process of claim 1, wherein the proportion of said rhenium catalyst to said cyclooctadiene is about 1 to 10 percent by weight.

8. The process of claim 1, wherein said polymerizing of said cyclooctadiene is in the gaseous phase or liquid phase.

9. The process of claim 8, wherein said polymerizing is at a temperature ranging from about 40° to 200°C.

* * * * *